United States Patent [19]
Mortensen et al.

[11] Patent Number: 5,366,686
[45] Date of Patent: Nov. 22, 1994

[54] METHOD FOR PRODUCING ARTICLES BY REACTIVE INFILTRATION

[75] Inventors: Andreas Mortensen; David C. Dunand, both of Cambridge, Mass.

[73] Assignee: Massachusetts Institute of Technology, a Massachusetts Corporation, Cambridge, Mass.

[21] Appl. No.: 34,731

[22] Filed: Mar. 19, 1993

[51] Int. Cl.[5] .................. B22F 7/08; B22D 19/00; C04B 35/02; C04B 35/65
[52] U.S. Cl. .......................................... 419/5; 419/10; 419/12; 419/14; 419/45; 264/60; 264/DIG. 30; 501/95; 501/96; 164/91
[58] Field of Search .................. 419/5, 10, 38, 14, 45, 419/4, 7, 12; 264/60, DIG. 36; 501/95, 96; 164/91; 428/539.5, 545, 472

[56] References Cited

U.S. PATENT DOCUMENTS

| | | | |
|---|---|---|---|
| 4,718,941 | 1/1988 | Halverson et al. | 75/236 |
| 4,737,476 | 4/1988 | Hillig | 501/87 |
| 4,793,859 | 12/1988 | Morelock | 75/245 |
| 4,832,892 | 5/1989 | Newkirk et al. | 264/109 |
| 4,885,130 | 12/1989 | Claar et al. | 419/12 |
| 4,885,131 | 12/1989 | Newkirk | 419/12 |
| 4,891,345 | 1/1990 | Nadkarni et al. | 501/155 |
| 4,904,446 | 2/1990 | White et al. | 419/13 |
| 4,940,679 | 7/1990 | Claar et al. | 501/96 |
| 4,978,644 | 12/1990 | White et al. | 501/96 |
| 5,000,248 | 3/1991 | Newkirk et al. | 164/97 |
| 5,001,001 | 3/1991 | Ritter | 428/218 |
| 5,004,714 | 4/1991 | Claar et al. | 501/134 |
| 5,010,044 | 4/1991 | Newkirk | 501/93 |
| 5,017,334 | 5/1991 | Claar et al. | 419/12 |
| 5,019,539 | 5/1991 | Claar et al. | 501/87 |

OTHER PUBLICATIONS

A. G. Merzhanov, "Self-Propagating High-Temperature Synthesis: Twenty Years of Search and Findings", *Combustion And Plasma Synthesis Of High-Temperature Materials*, Editors: Z. A. Munir, J. B. Holt, VCH, New York, pp. 1–53, 1990.

Zuhair A. Munir, "Synthesis of High Temperature Materials by Self-Propagating Combustion Methods", *Ceramic Bulletin*, 67, pp. 342–349, 1988.

Yoshinari Miyamoto, "New Ceramic Processing Approaches Using Combustion Synthesis Under Gas Pressure", *Ceramic Bulletin*, 69, pp. 686–690, 1990.

W. R. Wrzesinski, J. C. Rawers, "Self-propagating high-temperature synthesis of TiAl–SiC and TiAl–Al$_2$O$_3$ intermetallic composites", *Journal of Materials Science Letters*, 9, pp. 432–435, 1990.

Douglas M. Matson, Zuhair A. Munir, "Combustion synthesis of intermetallic compounds using titanium, nickel and copper wires", *Materials Science and Engineering*, A153, pp. 700–705, 1992.

R. W. Rice, "Review Microstructural aspects of fabricating bodies by self-propagating synthesis", *Journal of Materials Science*, 26, pp. 6533–6541, 1991.

Government Industrial Research Institute, Nagoya, AIST (Japan), "Manufacture of Intermetallic Compounds by Squeeze Casting Process", *New Technology Japan–Japan External Trade Organization, Machinery and Technology, Dept.,* Tokyo, Japan, p. 13, 1992.

Hideharu Fukunaga, Xiaoguang Wang, Yuzi Aramaki, "Preparation of intermetallic compound matrix composites by reaction squeeze casting", *Journal of Materials Science Letters*, 9, pp. 23–25, 1990.

(List continued on next page.)

*Primary Examiner*—Donald P. Walsh
*Assistant Examiner*—Anthony R. Chi
*Attorney, Agent, or Firm*—Florence Fusco McCann

[57] ABSTRACT

A method for producing an article including a refractory compound by infiltrating a preform with a liquid infiltrant and initiating a reaction between the preform and the liquid infiltrant to establish a reaction front which propagates in a direction opposite to the direction of flow of the liquid infiltrant is provided, as are articles prepared according to this method.

35 Claims, 6 Drawing Sheets

OTHER PUBLICATIONS

S. Nourbakhsh, H. Margolin, F.l. Liang, "Microstructural Observations of Pressure Cast $Ni_3Al/Al_2O_3$ and $Ni/Al_2O_3$ Composites", *Metallurgical Transactions, A,* 20A, pp. 2159–2166, Oct., 1989.

N. S. Stoloff, D. E. Alman, "Innovative Processing Techniques for Intermetallic Matrix Composites", *MRS Bulletin,* 15, pp. 47–53, Dec. 1990.

Philip West (ed.), "Infiltration Method Yields Dense, Tough Intermetallic Composites", *Advanced Materials,* Sep. 14, 1992, p. 3, (Abstract No. 92G5–0090), ASM International Materials Park, Ohio.

Katsuaki Suganuma, "Simple fabrication process of intermetallic compounds utilizing low–temperature pressure casting of aluminum", Materials Letters, 16, (1993), 22–25.

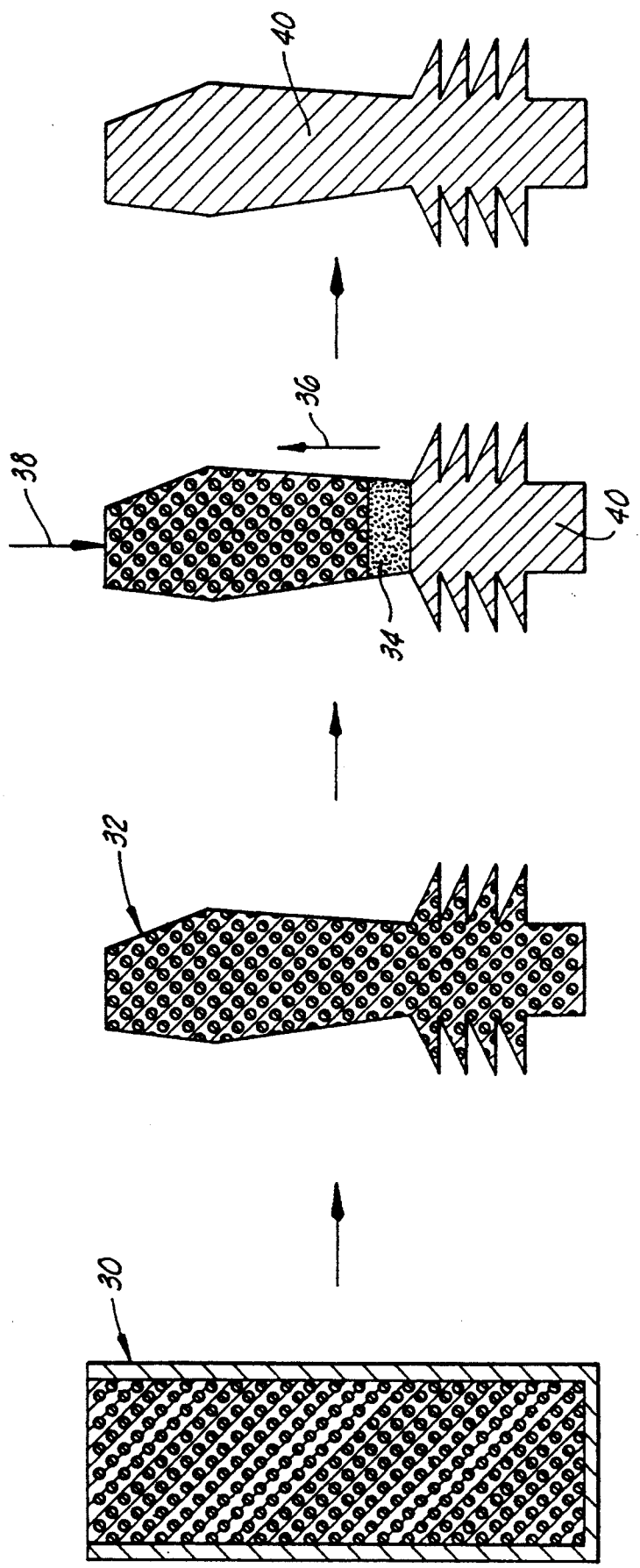

METHOD FOR PRODUCING ARTICLES BY REACTIVE INFILTRATION

BACKGROUND OF THE INVENTION

1. Field of the Invention

The invention relates to a method for producing articles by reactive infiltration and to articles so produced. More particularly, the invention relates to a method for producing articles by directional reactive infiltration and to articles so produced.

2. Description of the Prior Art

Refractory compound materials include intermetallic compounds such as, for example, NiAl, Ni$_3$Al, Fe$_3$Al, FeAl, Ti$_3$Al and TiAl as well as silicide, oxide, boride, carbide and nitride compounds. Such compounds are usually produced using one of several techniques, including melting, casting, powder metallurgy processing techniques and infiltration processes. Such compounds are desirable for use in hostile environments because of their high melting points, as well as corrosion and oxidation resistance. However, the performance of these materials is often marred by brittleness near room temperature, and service temperatures which are low by comparison with the melting points of the compounds. In order to improve these properties, refractory second phase reinforcements are often added to the refractory compound materials which complicates processing of these materials.

Reactive powder metallurgy techniques wherein elemental powders of the elements making up the compound are mixed and compacted to form powder compacts which are then heated to a temperature at which the elemental powders react vigorously to form the desired compound are especially attractive for the processing of these refractory materials. Elemental powders are readily commercially obtainable and easy to compact.

In reactive powder metallurgy processing, heating of reactant materials to high temperature is avoided and, instead, this processing makes it possible to take advantage of the high enthalpic stability of the desired product compound to chemically drive synthesis of the compound with an accompanying release of heat. According to reactive powder metallurgy techniques, the elemental powder compacts are usually heated to the lowest temperature at which a liquid phase is formed, so that liquid phase densification occurs simultaneously with the rapid heating resulting from exothermic formation of the desired compound. The chemical composition of the resulting material can be tailored by adjusting the ratio of elemental powders making up the powder compact.

Disadvantages associated with reactive powder metallurgy techniques include a frequent need for further densification of the refractory compound material by application of external pressure, either during or after the reaction, in order to eliminate undesirable porosity in the refractory material. Generally, this external pressure is applied using expensive processing steps such as hot isostatic pressing. It is often difficult to control the powder reaction kinetics and fiber or whisker reinforcements, included to produce a reinforced composite refractory material. Reinforcements often break during powder compaction, making reactive powder metallurgy techniques unattractive for reinforced refractory compound fabrication.

A second processing technique useful for refractory compound material fabrication, including reinforced composite refractory compound materials, is infiltration processing. Infiltration processing involves the injection of a liquid infiltrant into the interstices of a preform, which can include fiber, whisker or particle second phase reinforcements. There exist several types of infiltration processes including (1) pressureless infiltration, (2) pressure infiltration and (3) reactive infiltration processes. There is frequently overlap among these infiltration processes, and, for example, a reactive infiltration process may be performed with pressurized or unpressurized infiltrant.

Pressureless infiltration techniques include the Lanxide process, for example U.S. Pat. No. 4,904,446 to White et al., issued Feb. 27, 1990.

More commonly, pressure is applied to force a liquid infiltrant into the porous preform. Pressure infiltration processes include squeeze casting, for example Fukunaga et al., *Journal of Materials Science Letters*, 9 (1990) 23–25, variations of die-casting and pressurized gas driven infiltration. These techniques have been applied to high-melting point materials, including nickel aluminide and titanium aluminide, for example Nourbakhsh et al., *Metallurgical Transactions A*, 20A, (1989) 2159–2166. Applying pressure to the liquid infiltrant makes the process faster, improves the microstructure of the material produced, and minimizes undesirable chemical reactions between the preform and the infiltrant.

In reactive infiltration processes, a compound is formed by infiltration of a porous, solid preform with a liquid infiltrant which reacts with the preform to form a desired refractory compound material. In conventional reactive infiltration processes, the reaction progresses globally in a direction parallel to the direction of liquid infiltrant flow. Using reactive infiltration techniques, a composite can be produced, either by incorporating inert second phase reinforcements in the preform or by forming a second reinforcement phase as the result of an in-situ reaction. Reactive infiltration has been used successfully to produce ceramic materials such as silicon carbide, for example U.S. Pat. No. 4,737,476, to Hillig, issued Apr. 12, 1988.

Difficulties encountered in reactive infiltration processing include an inability to control the reaction rate such that it remains sufficiently slow to permit complete infiltration of the preform, but sufficiently high to form the desired compound material in a reasonable process time. Flow of liquid infiltrant into the preform becomes blocked when the compound product of the chemical reaction between the infiltrant and preform, which is most often a solid, grows to such an extent where the liquid infiltrant first enters the preform so that flow of the liquid infiltrant is blocked beyond that point, precluding the filling of pores resulting from reaction or solidification-induced shrinkage downstream from the liquid infiltrant entry point, or even blocking complete preform infiltration.

Another technique for the fabrication of refractory compound materials is self-propagating synthesis (SHS), also known as self-propagating high-temperature synthesis, wherein a strongly exothermic reaction, i.e. combustion, is initiated among powders in a powder compact as described by Wrzesinski et al., *Journal Of Materials Science Letters*, 9, (1990) 432–435 and Merzhanov, *Combustion And Plasma Synthesis Of High-Temperature Materials*, Z. A. Munir, J. B. Holt, (Eds.) VCH, New York (1990) 1-53. Here, as in other powder processes, volume changes may leave pores.

Thus, there exists a need for a versatile, near-net-shape and economical process appropriate for composite fabrication which results in production of materials which do not require further densification and which allows precise control of the reaction rate between the liquid infiltrant and the preform so that the product material is dense and fully reacted.

SUMMARY OF THE INVENTION

The invention provides a method for preparation of articles, including composites, in near-net-shape form wherein the reaction rate between the liquid infiltrant and the preform is controlled by establishing a reaction front which propagates in a direction opposite to the direction of liquid infiltrant flow, obviating the need for additional densification steps of prior art processes to result in a fully dense, fully reacted article. In one aspect of the invention, a method is provided for producing an article which includes an intermetallic refractory compound including the steps of (a) providing a preform, (b) infiltrating the preform with liquid infiltrant so that the liquid infiltrant flows into the preform at a first location in a first direction and (c) initiating a reaction between the preform and the infiltrant to establish a reaction front at a second location which propagates in a direction opposite to the direction of infiltrant flow.

In another aspect of the invention, a fully dense, fully reacted article, having a porosity in the range of from about 5 percent by volume to about 10 percent by volume and more preferably from about 1 percent by volume to about 5 percent by volume is provided.

It is an object of this invention to provide a method for fabricating a fully dense, fully reacted article including a compound which is compatible with the inclusion of a reinforcement phase.

Another object of the present invention is provision of articles, including a compound, produced according to the method of the invention.

A further object of the invention is provision of articles, including a compound, which are fully dense, fully reacted and produced to net, or near net, shape and characterized by high chemical purity.

Other and further objects, features and advantages of the present invention will be readily apparent to those skilled in the art upon reading the description of the preferred embodiments which follows.

BRIEF DESCRIPTION OF THE DRAWINGS

FIGS. 5, 6, 7 and 8 are a schematic illustration of a method for manufacture of a near-net-shape article according to the method of the invention.

DETAILED DESCRIPTION OF THE INVENTION

Figure 1:
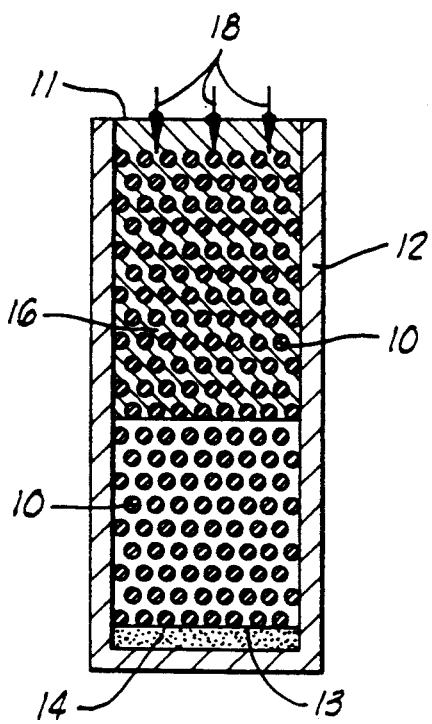
FIG. 1 is a schematic illustration of a preform cross-section being infiltrated with a liquid infiltrant according to the method of the invention.

The invention provides a method for producing an article including a refractory compound including steps of infiltrating a preform with a liquid infiltrant and initiating a reaction to establish a reaction front which propagates in the opposite direction from that of liquid infiltrant flow. An article, including a compound, prepared according to the foregoing method and a fully dense, fully reacted article further characterized by a chosen shape and produced to net, or near net, shape and having high chemical purity are also provided.

As used herein, refractory compounds are materials having a high heat of formation ($\Delta H$) which are difficult to fuse under ordinary conditions and are capable of enduring exposure to high temperatures. Refractory compounds or materials are economically synthesized using reaction synthesis processes including self-sustaining high temperature synthesis (SHS) and include ceramic, cermet and intermetallic compounds whether prepared as bulk compounds or as composites. Refractory compounds and materials are characterized by an adiabatic combustion temperature adequate to establish a combustion reaction wave front which is self-sustaining. Matson et al., "Combustion synthesis of intermetallic compounds using titanium, nickel and copper wires", *Materials Science and Engineering*, A153 (1992), pages 700-705, proposes an empirical relationship which suggests that a combustion reaction wave front will not be self-sustaining for an adiabatic combustion temperature less than or equal to 1800K. Of course, such a determination can depend on the initial temperature of the reactants, the predicted phases and quality of the products and other factors which can vary among individual reactant systems and can allow for adiabatic combustion temperatures lower than 1800K. Munir, "Synthesis of High Temperature Materials by Self-Propagating Combustion Methods", *Ceramic Bulletin*, 67 (1988), page 345, provides a Table II listing adiabatic combustion temperatures for different materials.

As used herein, the term "preform" refers to a porous, solid body which can be made up of a powder of an element, a mixture of powders of elements and which can optionally include a "reinforcement phase" such as particles, whiskers or fibers of an inert refractory compound. Also, "infiltrating" refers to the injection of a liquid matrix phase, referred to herein as the "liquid infiltrant" into the pores or interstices within the preform. As used herein, the term "reaction front" refers to a spatial region in the preform where a chemical reaction between the liquid infiltrant and the preform occurs. This reaction front is said to "propagate", that is move spatially within the preform, as the reaction between the liquid infiltrant and the preform is completed, resulting in formation of the desired compound.

The liquid infiltrant can include a first element which reacts with a second element in the preform to form the desired compound. The liquid infiltrant can be a molten metal such as aluminum, silicon, nickel, titanium or iron or alloys thereof. The liquid infiltrant can be injected into the preform under pressure.

The preform can contain a "reactive solid phase", a solid material which is highly reactive with the liquid infiltrant and participates with the liquid infiltrant in a highly exothermic reaction which liberates an enthalpy of reaction $\Delta H$ such that $\Delta H$ divided by the average heat capacity of the starting materials is a substantial fraction of the absolute melting point of the desired compound, said ratio being preferably above 0.1, more preferably above 0.5, which raises the temperature in the region of the preform where the liquid infiltrant contacts and reacts with the reactive solid phase to a sufficiently high temperature to initiate a reaction between the liquid infiltrant and the preform. The reactive solid phase reacts with the liquid infiltrant to produce a minimum amount of a gaseous reaction product to avoid entrapment of gas bubbles and associated pore formation within the article. The reactive solid phase should have a low impurity content, preferably below about 0.1%.

The reactive solid phase can constitute from about 10 percent by volume to about 90 percent by volume of the preform and can be incorporated at any desired location within the preform or on the preform outer surface to produce a coating of the compound in the finished article. The preform can include a mixture of more than one element or chemical compound, and can be configured so that the chemical composition of the preform varies spatially forming a spatial composition gradient so that any segregation in the final infiltrated product resulting from selective element transport by the flowing infiltrant is compensated for, or so that the compound being formed has a composition gradient.

The reactive solid phase can be incorporated anywhere within the preform and is generally selected so that it does not react chemically with other phases in the preform. The reactive solid phase can be an elemental constituent of the compound and can be in the form of a fine powder, having a particle size in the range of from about 0.1 $\mu$m to about 5 mm, more preferably in the range of from about 1 $\mu$m to about 500 $\mu$m. The reactive solid phase can be a fine powder of nickel, iron, titanium, mixtures thereof, and many other elements or compounds.

The reaction front where the liquid infiltrant and the preform react is established at a second location in the preform where the liquid infiltrant first reacts strongly with the reactive solid phase.

The step of initiating a reaction between the preform and the liquid infiltrant can also be accomplished by applying a torch flame, a laser pulse, resistance heating, an electrical discharge or combination of the foregoing techniques to the preform and liquid infiltrant, instead of providing a reactive solid phase.

The compound produced according to the method of the invention can be a refractory compound, including carbides such as silicon carbide, germanides such as $Ni_3Ge$ and silicides such as molybdenum disilicide and nickel silicide. Intermetallic compounds such as $Nb_3Sn$, $Fe_3Al$, $FeAl$, $Ti_3Al$, $TiAl_3$, $TiAl$, $Ni_3Al$, $NiAl$ and $CoAl$ can also be prepared according to the method of the invention.

The preform can be a previously prepared, partially reacted preform produced in a prior reactive infiltration process and can be machined into the shape of the desired article. The initial temperature of the preform before introduction of the infiltrant can be selected to avoid oxidation of the preform and can be well below the infiltrant liquidus temperature. For production of TiAl, a titanium-containing preform can be kept at a temperature below about 400° C. There is no significant oxygen pick-up by the titanium metal. For $Ti_3Al$, provided that some limited extent of reaction takes place between the aluminum infiltrant and the titanium preform, it can also be possible to keep the initial titanium temperature at about 400° C., thus alleviating stringent atmospheric requirements necessary to avoid matrix contamination by oxygen.

The preform is characterized by a porosity which is adequate to permit infiltration by the liquid infiltrant and selected such as by control of powder size to minimize reaction between the preform and liquid infiltrant near the point of liquid infiltrant introduction and by a low shrinkage such as in the range of from about 1% to about 15% to allow fabrication of a near-net-shape article. Preform porosity as measured using metallographic methods well known to one skilled in the art, for example, may assume any value suited for the desired final compound composition provided porosity is mostly open, i.e., interconnected and accessible from the infiltration entrance and can be in the range of from about 10 percent by volume to about 90 percent by volume.

The preform can also include a reinforcement phase, generally an inert solid phase which imparts desirable mechanical and heat resistant properties to the article produced. The reinforcement phase can be present in the preform in a particle, whisker, fiber, plate, or interconnected cellular structure form and constitutes in the range of from about 1 percent by volume to about 90 percent by volume, and more preferably 5 percent by volume to about 60 percent by volume of the preform. The reinforcement phase can be a refractory material such as $Al_2O_3$, $TiB_2$, $B_4C$ and SiC in the form of particles, whiskers, fibers, plates, porous bodies or interconnected cellular structures chosen for particular applications on the basis of chemical reactivity, morphology and thermal expansion characteristics. Alumina ($Al_2O_3$) is preferred for its chemical stability, availability in fiber and particle form and relatively high (for a ceramic) coefficient of thermal expansion, $9 \cdot 10^{-6} K^{-1}$. Before infiltration, the preform can be maintained at a temperature below the infiltrant liquidus temperature.

The article produced according to the invention is characterized by "low porosity" which is used herein in the specification and claims to refer to an essentially pore-free and homogeneously reacted structure, with porosity in the range of from about 5 percent by volume to about 10 percent by volume, more preferably in the range of from about 1 percent by volume to about 5 percent by volume and most preferably from about 0.1 percent by volume to about 1 percent by volume. The article is "reacted", which is used herein to mean that in the range of from above about 50 percent by volume, preferably above about 90 percent by volume of the article is free of initial reactant materials, i.e., infiltrant or reactive solid reactants. It may also be desirable, however, to keep some of the initial reactant material unreacted, to impart a desirable property such as toughness or ductility to the product.

Figure 2:
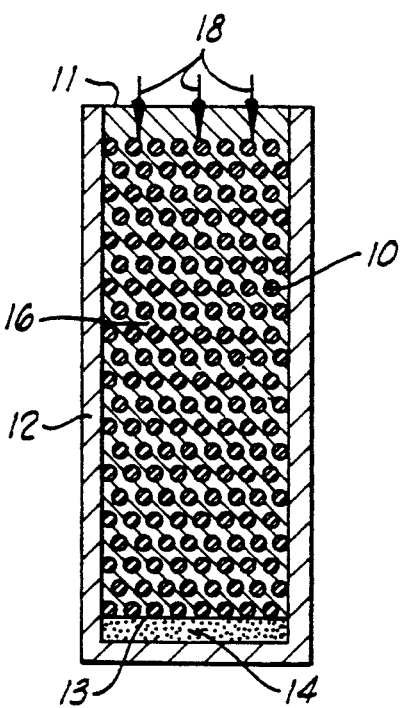
FIG. 2 is a schematic illustration of a preform cross-section which has been completely infiltrated with a liquid infiltrant according to the method of the invention.
Figure 3:
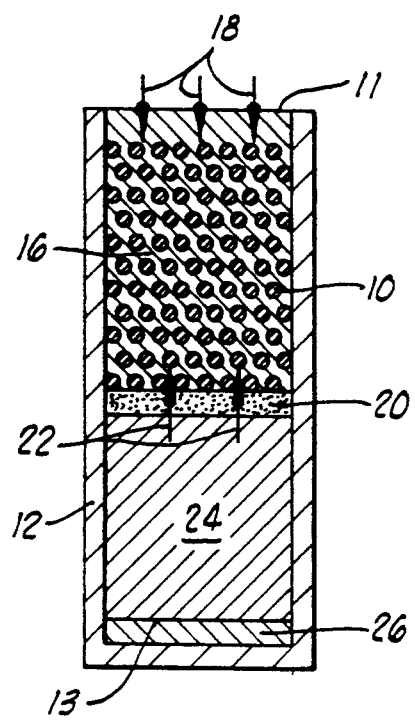
FIG. 3 is a schematic illustration of a preform cross-section wherein reaction has begun to take place between the preform and the liquid infiltrant according to the method of the invention.

FIGS. 1–3 schematically depict a preferred embodiment of a method for producing an article containing a compound according to the method of the invention.

FIG. 1 shows a cross-section of preform 10 which can be metal powder contained within crucible 12 which can be made of a chemically stable, refractory material such as alumina, SiC, $B_4C$ or Mo. Reactive solid phase 14 which can be a fine metal powder composed of the same metal as the preform, is placed at bottom 13 of preform 10. FIG. 1 shows an early stage of infiltration of preform 10 with liquid infiltrant 16, which can be a molten metal. Arrows 18 show the direction of flow of infiltrant 16.

Preferably, the rate of infiltration of liquid infiltrant 16 is maximized in order to keep reaction between liquid infiltrant 16 and preform 10 as infiltrant 16 is introduced into preform 10 to a minimum. This control of reaction rate is achieved by (1) introducing liquid infiltrant 16 into preform 10 with applied pressure, such as by mechanically propelling liquid infiltrant 16 into preform 10, so that the infiltration velocity is increased, thereby permitting infiltration of a longer preform; (2) initially maintaining preform 10 at a low temperature, preferably below the liquidus temperature of liquid infiltrant 16 so that the initial rate of reaction between the preform and the infiltrant is kept low as the heat of reaction is dissipated within preform 10; (3) controlling the morphology, porosity and specific surface area of solid reactant powder which can compose preform 10; and, optionally, (4) including a reinforcement phase (not shown in FIGS. 1–3), preferably an inert material, when production of a composite is desired and also to act as a heat sink and slow down exothermic reactions; or (5) including a finite volume fraction of the product compound in the preform to act as a heat sink and slow down exothermic reactions.

In FIG. 2, liquid infiltrant 16 has fully infiltrated preform 10 and liquid infiltrant 16 has just reached reactive solid phase 14. When liquid infiltrant 16 reaches reactive solid phase 14, liquid infiltrant 16 reacts rapidly with reactive solid phase 14, releasing heat which increases the local temperature of preform 10 so that the local temperature is in a range where reaction between the remainder of preform 10 and liquid infiltrant 16 is both rapid and self-sustained.

FIG. 3 shows the progress of the reaction between liquid infiltrant 16 and preform 10. Reaction between liquid infiltrant 16 and preform 10 occurs at propagating reaction front 20. The direction of propagation of reaction front 20 is given in FIG. 3 by arrows 22 and is in a direction opposite to the direction of flow of liquid infiltrant 16 as given by arrows 18. Liquid infiltrant 16 flowing into preform 10 at preform top 11 is able to flow through preform 10 and reach propagating reaction front 20 so that it can feed reaction-induced volume changes and solidification shrinkage, thus resulting in a fully dense and fully reacted reaction product 24. Since shrinkage is fed with liquid infiltrant 16, little or no microscopic deformation of the preform is required to achieve densification, i.e. no additional processing steps such as isostatic pressing are required, which makes the process of the invention ideally suited for production of composites including reinforcement phases such as long ceramic fibers which are brittle and easily damaged by any deformation processing steps.

Ignition reaction product 26 results from reaction of liquid infiltrant 16 with reactive solid phase 14 and can have a different chemical composition from reaction product 24 if reactive solid phase 14 has a different composition from preform 10. Even if reactive solid phase 14 has the same chemical composition as liquid infiltrant 16, it is expected to differ from reactive preform 10 in the following respects: smaller particle size, so as to present a much higher specific contact surface with the infiltrant, and no inert additions, such as a reinforcement so that no heat-sinking lowers preform temperature. However, since ignition reaction product 26 is located at an extreme end of reaction product 24 it can be removed from reaction product 24 by any means known to one skilled in the art including mechanical means such as sawing and chemical means such as selective dissolution.

Figure 4:
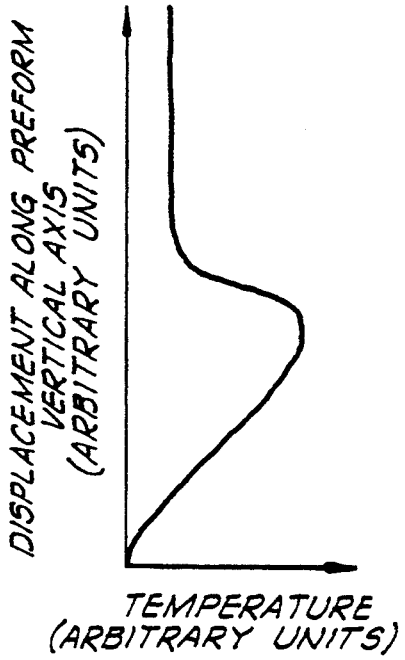
FIG. 4 is a graph showing temperature as a function of displacement along the vertical axis of the preform shown in FIG. 3.

FIG. 4 is a graph representing the temperature profile maintained within preform 10 during the stage of the method depicted schematically in FIG. 3 and is a plot of temperature as a function of position along the vertical axis of preform 10. From FIG. 4, it is evident that an approximately uniform, low temperature is maintained at preform top 11 where liquid infiltrant 16 is first introduced into preform 10. A maximum temperature exists over the vertical extent of propagating reaction front 20 and temperature decreases along the vertical extent of reaction product 24 as the heat of reaction and solidification liberated by formation of reaction product 24 is lost to the surroundings by heat conduction.

In another embodiment, a finished article having an intricate shape can be produced as illustrated schematically in FIGS. 5, 7 and 8. According to FIGS. 5, 6, 7 and 8, a partially reacted precursor 30 which can be produced using reactive infiltration techniques as well known to one skilled in the art can be machined or otherwise formed to produce machined preform 32 which has a complex shape. Partially reacted precursor 30 is more readily machined or formed than a fully reacted intermetallic or ceramic compound because a significant portion of partially reacted preform 30 is still unreacted, ductile metal. A liquid infiltrant which was originally used in the conventional reactive infiltration process used to produce partially reacted preform 30 can be remelted and pushed into partially reacted preform 32 toward reaction front 34 which is "ignited" or established using a local heating technique such as application of a torch flame, a laser pulse, resistance heating, an electrical discharge or any combination of these techniques. Reaction front 34 propagates in the direction given by arrow 36 which is a direction opposite to the direction of remelted infiltrant flow as indicated by arrow 38 so that remelted liquid infiltrant 31 feeds reaction front 34, as previously described, resulting in production of fully reacted, fully dense reaction product 40 in the shape of machined preform 32.

Using the foregoing methods, it is possible to cast shape a class of materials that are generally difficult to machine. Other advantages offered by the method of the invention are (1) reactive powder mixing is avoided;

(2) powder pressing, which breaks fiber or whisker reinforcement phases in conventional powder processing is reduced; (3) liquid infiltrant material cost is low, particularly when special prealloyed aluminum liquid infiltrant materials are used; (4) preforms can be initially maintained at temperatures well below the infiltrant liquidus temperature during the infiltrating step of the process which can be particularly useful for production of compounds such as TiAl wherein the temperature of titanium before reaction can be kept below 400° C. to avoid any significant oxygen pick-up by the metal, alleviating stringent atmospheric control necessary to avoid contamination in all other processes; (5) there is no oxide incorporation from aluminum or other oxidation-prone constituent powders when fabricating compounds including an aluminum oxidation-prone constituent; (6) powder compact slumping which is observed when liquid forms in powder compacts is not a limitation since powders are held in a die or crucible during infiltration; and, finally, (7) partly reacted metal powder particle sintering which prevents densification by particle rearrangement in conventional powder processes does not occur in the method of the invention.

In order to further illustrate the method of the present invention and the characteristics of articles produced according to that method, the following examples are provided. The particular compounds and processing conditions utilized in the examples are meant to be illustrative of the present invention and not limiting thereto.

EXAMPLE 1

The following example is provided to show the characteristics of a nickel aluminide/alumina composite article prepared using conventional sintering and reactive infiltration processing for comparison with the characteristics of an article produced according to the present invention.

Figure 9:
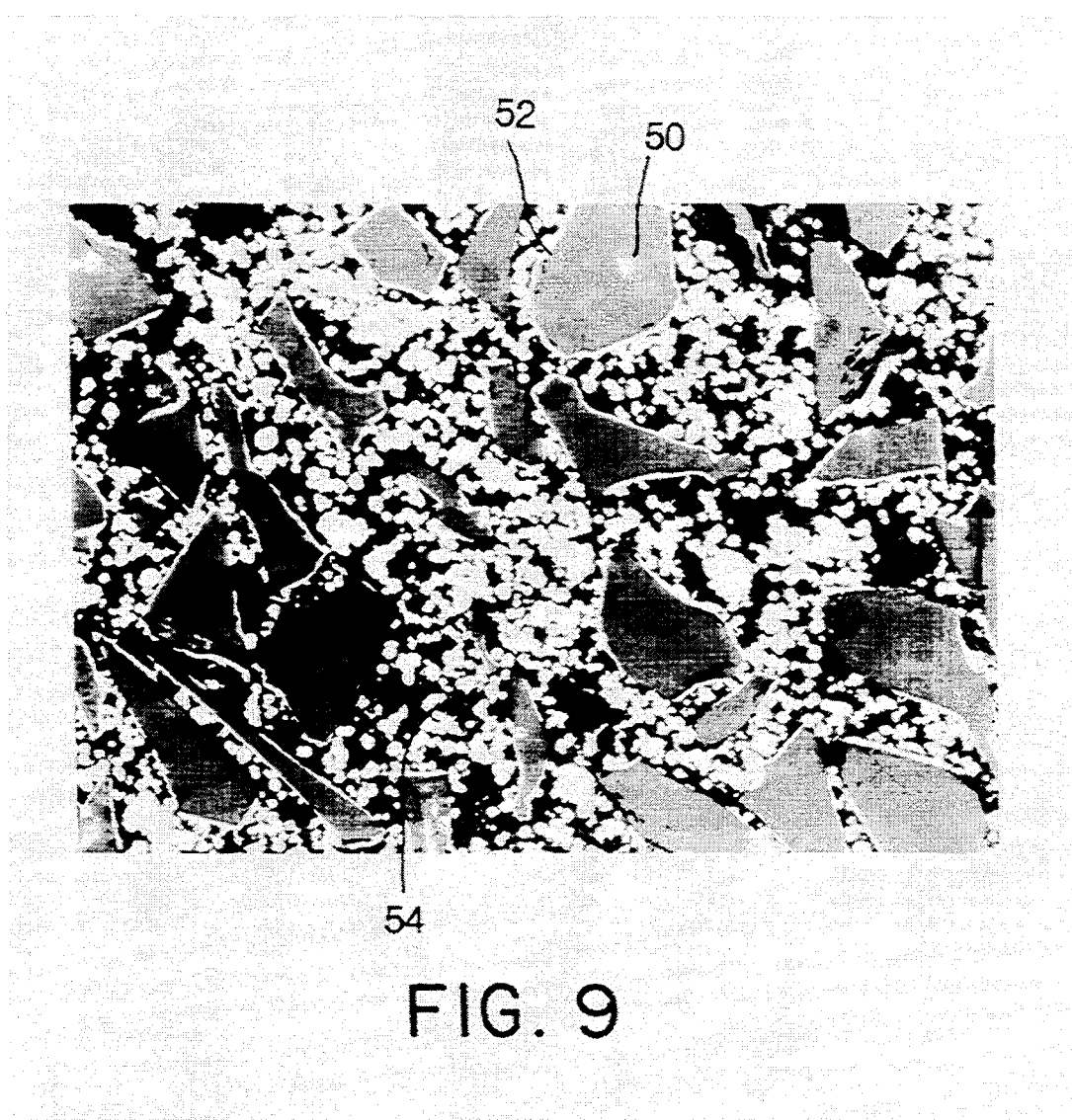
FIG. 9 is an optical micrograph (90X) showing the microstructure of a nickel/alumina preform prepared by sintering nickel and nickel-coated alumina particles together.

FIG. 9 is an optical micrograph, magnification 90× and shows a preform containing 21 percent by volume fine nickel spheres 54 approximately 10 μm in diameter, and 35 percent by volume alumina particles 50 having nickel coating 51, 100–200 μm in diameter, prepared by sintering a mixture of nickel and alumina powders in a crucible in vacuum.

Figure 10:
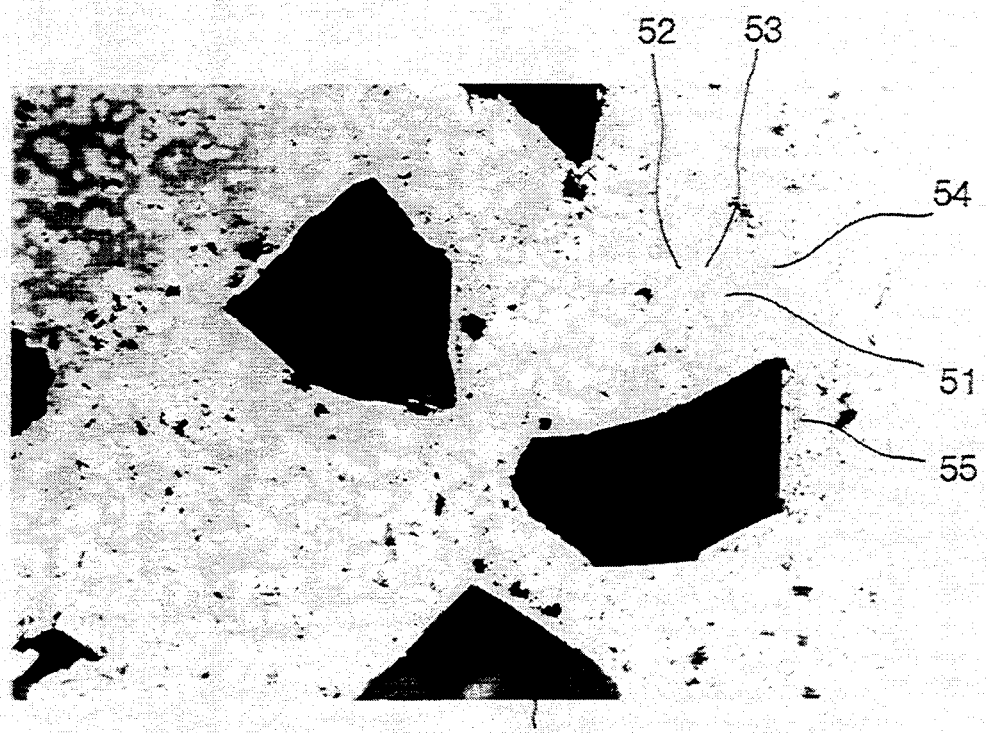
FIG. 10 is an optical micrograph (180X) showing the microstructure of the preform of FIG. 6 after infiltration by liquid aluminum.

The preform whose microstructure is shown in FIG. 6 was subsequently infiltrated with liquid aluminum at a temperature of 665° C., after preheating to a temperature of 285° C. Gas-driven infiltration apparatus as known in the art and described in L. J. Masur et al., *Metall. Trans.*, 20A, (1989) 2549–2557 was used to apply a pressure of 3.6 MPa (520 psi) over a period of 33 seconds. The microstructure of the compound produced is shown in the optical micrograph of FIG. 10 and has unreacted nickel particles 51, unreacted aluminum 52, two nickel aluminide phases, Al$_3$Ni 53 and Ni$_2$Al$_3$ 54, and an aluminum/nickel eutectic composition 5.7 weight % Ni and balance Al as well as alumina particles 50. Some porosity 55 is present presumably because no external pressure was applied during solidification.

EXAMPLE 2

This example is provided to show the characteristics of a nickel aluminide/alumina composite prepared using conventional reactive infiltration techniques with application of pressure during solidification for comparison with the characteristics of an article produced according to the method of the invention.

Figure 11:
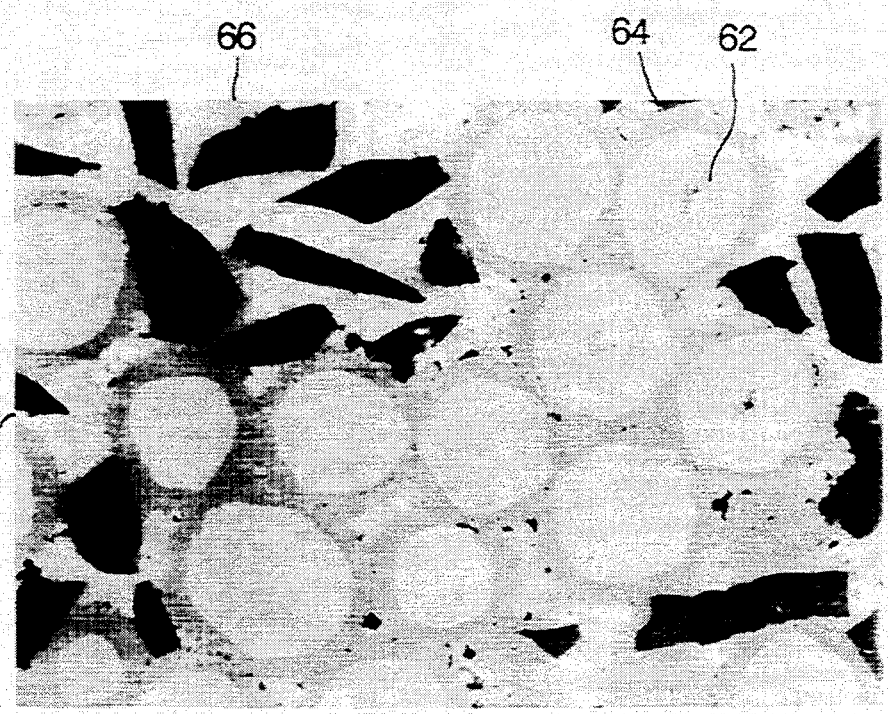
FIG. 11 is an optical micrograph (90X) showing the microstructure of a sample resulting from infiltration of a preform containing 31 percent by volume coarse nickel spheres and 34 percent by volume nickel-coated alumina particles with liquid aluminum.

FIG. 11 is an optical micrograph, magnification 90× showing the microstructure of a nickel aluminide/alumina composite prepared by infiltrating a preform containing 31 percent by volume coarse nickel spheres, about 200 μm in diameter, and 34 percent by volume nickel-coated alumina particles, in the range of from about 100–200 μm in diameter, with molten aluminum maintained at a temperature of 685° C. and at a pressure of 6.0 MPa (1000 psi) in an argon atmosphere. The preform was initially kept at 685° C. and solidification was conducted under pressure. The resulting compound, as shown in FIG. 11, has partially reacted nickel spheres 62, surrounded by nickel aluminide shell 64 and alumina particles 66 within matrix 68 which consists of aluminum and aluminide phases.

EXAMPLE 3

Example 3 is provided to show the microstructural characteristics of a nickel aluminide article prepared under conditions similar to those used in Example 2. However, the preform temperature is held at a temperature considerably lower than the liquidus temperature of the liquid aluminum infiltrant for comparison with the characteristics of an article produced according to the method of the invention.

Figure 12:
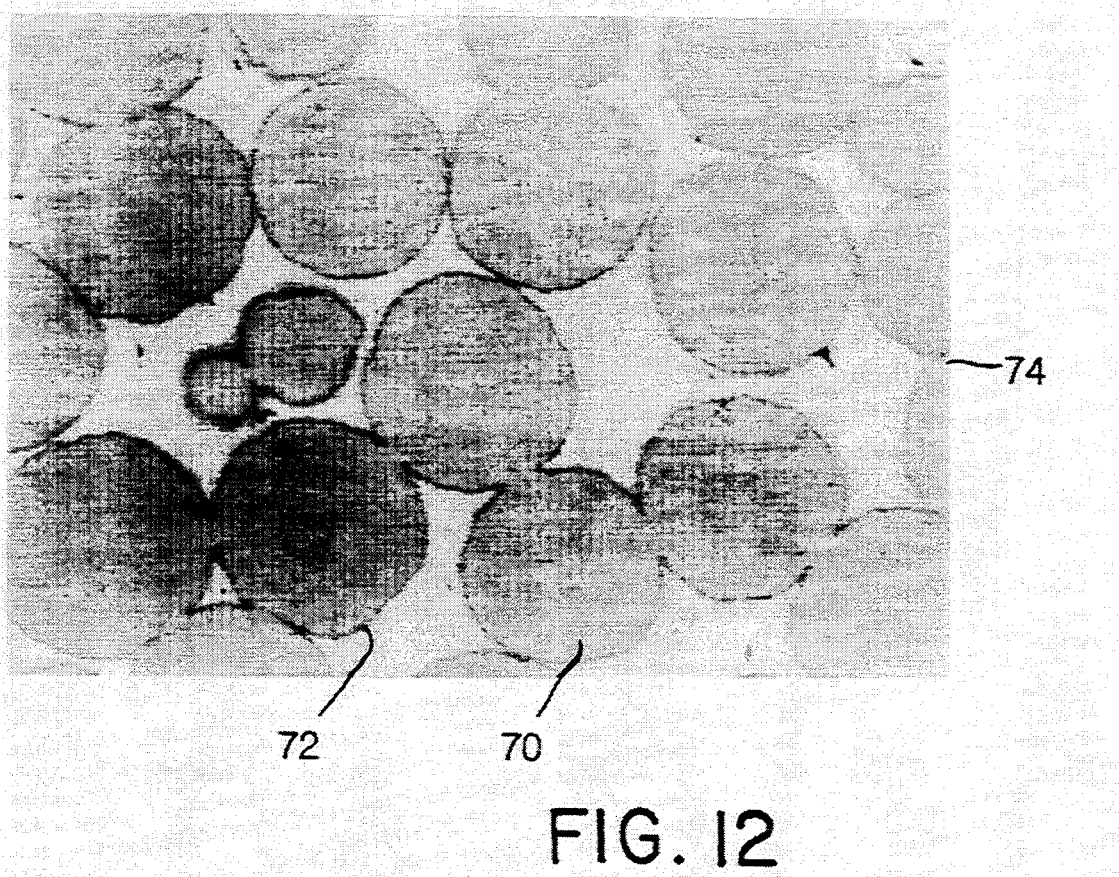
FIG. 12 is an optical micrograph (120X) showing the microstructure of a sample resulting from infiltration of a preform containing 51 percent by volume nickel spheres with liquid aluminum.

A preform containing 51 percent by volume coarse nickel spheres, about 200 μm in diameter was infiltrated with molten aluminum infiltrant heated to a temperature of 665° C. and pressurized to 3.5 MPa (510 psi) for a duration of 46 seconds in an argon atmosphere. The preform was initially maintained at a temperature of 285° C. The microstructure of the resulting article is shown in the optical micrograph (magnification 120×) of FIG. 12. In FIG. 12, nickel spheres 70 are surrounded by nickel aluminide shell 72 within matrix 74 which consists of an extremely fine aluminum/nickel eutectic composition. Nickel aluminide shell 72 is much thinner than nickel aluminide shell 64 evident in the optical micro-graph of FIG. 11 because the preform of Example 3 was kept at a considerably lower temperature, 285° C., than the preform of Example 2 which was kept at 685° C. and allowed a higher degree of reaction to occur between the nickel spheres and molten aluminum infiltrant.

EXAMPLE 4

The following example is provided to show the microstructural characteristics of a nickel aluminide article prepared using reactive infiltration techniques including solidification under pressure for comparison with the characteristics of an article prepared according to the method of the invention.

A preform containing 60 percent by volume coarse nickel spheres, approximately 200 μm in diameter, was infiltrated with molten aluminum preheated to 685° C. and introduced into the preform at a pressure of 6.9 MPa (1000 psi) and solidified under pressure in an argon. atmosphere. The preform was also kept at 685° C.

Figure 13:
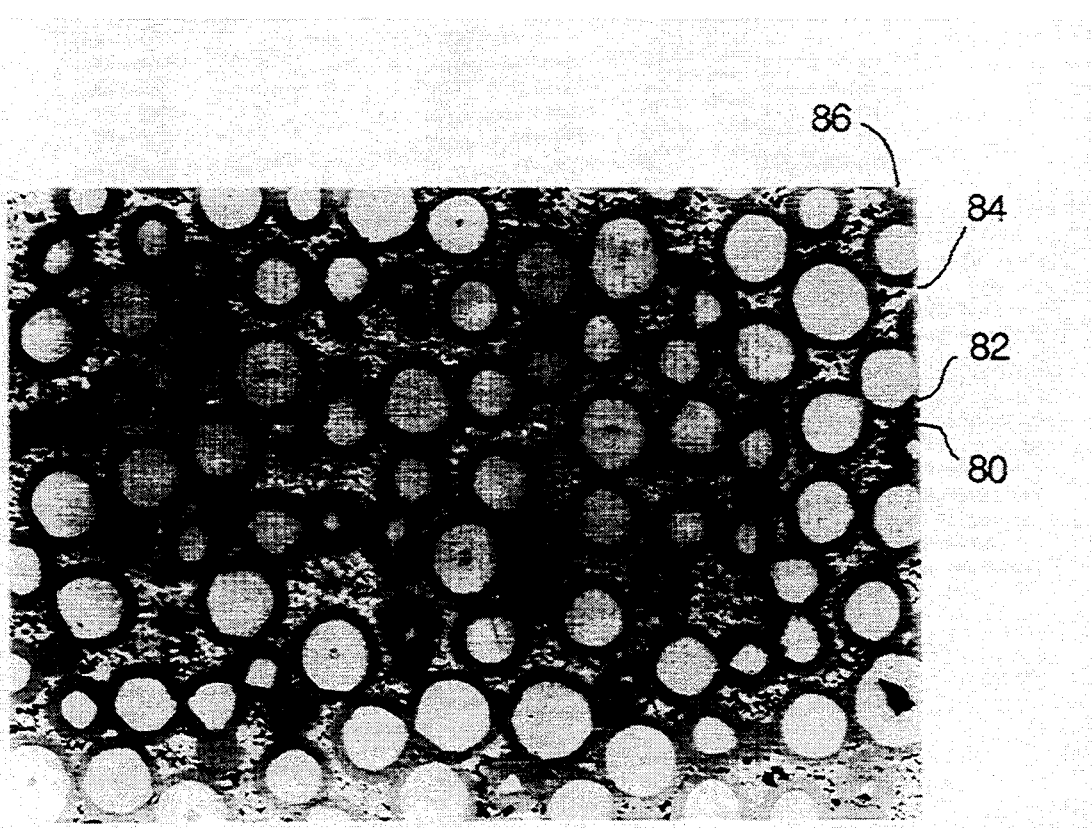
FIG. 13 is an optical micrograph (37.5X) showing the microstructure of a sample resulting from infiltration of a preform containing 55 percent by volume coarse nickel spheres with liquid aluminum.

FIG. 13 is an optical micrograph magnification 50× which shows the microstructure of the nickel aluminide material produced. In FIG. 13, nickel spheres 80 are surrounded by nickel aluminide shell 82 within matrix 84 which consists of aluminum and aluminide material and pores 86 which probably occur because of early choking and incomplete feeding of the reaction front due to blockage from formation of solid reaction product at the area of the preform where the molten aluminum is first introduced. Nickel aluminide shell 82 is thick because the preform was kept at an elevated temperature of 685° C.

EXAMPLE 5

The following example describes the production of a nickel aluminide article according to the method of the invention and shows the superior microstructural characteristics of the material produced by comparison with the material produced according to Example 4, as well as Examples 1–3.

A preform containing 50 percent by volume coarse nickel spheres, about 200 μm in diameter below which a second preform with 47 percent by volume coarse nickel spheres about 150 mm in diameter was located and below which a reactive solid phase consisting of fine nickel powder, about 12 μm in diameter, was located was infiltrated with molten aluminum infiltrant at a temperature of 709° C. and pressure of 6.9 MPa (1000 psi) in an argon atmosphere. The preform containing the reactive solid phase, fine nickel powder, was also preheated to a temperature of 709° C.

Figure 14:
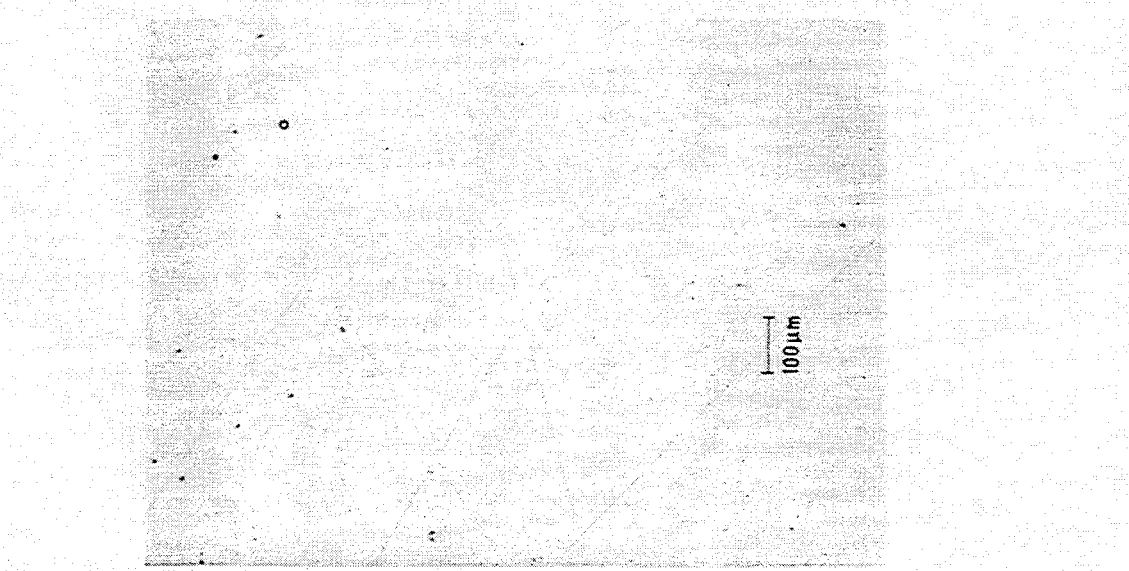
FIG. 14 is an optical micrograph (37.5X) showing the microstructure of a sample resulting from infiltration of a preform containing 50 percent by volume nickel spheres and a fine nickel powder reactive solid phase with liquid aluminum.

FIG. 14 is an optical micrograph, magnification 75×, a similar magnification as used in FIG. 13 of Example 4, taken in the region where the preform with 200 μm powder was located which shows the substantially featureless microstructure of the nickel aluminide article obtained indicating that the material is fully dense, characterized by a density estimated from the micrograph of FIG. 11 to be above 98 percent by volume fully reacted single phase aluminide with a few isolated pores.

Comparison of FIG. 14 with FIGS. 9–13 and especially with FIG. 13, which shows the microstructure of an article produced according to a method similar to that of the invention except for the absence of a reactive solid phase "fuse" to initiate reactions, demonstrates that full reaction can be initiated using such a reactive solid phase "fuse" and propagated through the sample in a one-step aluminide synthesis according to Example 5.

EXAMPLE 6

Example 6 is provided to show how a nickel aluminide composite article can be prepared according to the method of the invention.

A preform containing 32.5 percent by volume nickel, in the form of foils about 10 μm in thickness, between which 50 percent by volume alumina in the form of continuous fibers is placed, is positioned on top of a layer of iron oxide ($Fe_2O_3$) powder 1 μm in size.

The preform and $Fe_2O_3$ powder aggregate is infiltrated with a eutectic aluminum melt additionally containing 0.055 at. % boron, at a temperature of 700° C. and pressure of 6.9 MPa (100 psi) in an argon atmosphere. The preform containing the nickel, alumina and iron oxide is preheated to 400° C. During infiltration, little reaction takes place between the nickel and the melt as a result of the low temperature of the preform. When the melt reaches the iron oxide after having infiltrated the remainder of the preform, the highly exothermic thermite reaction takes place, whereby aluminum reacts with iron oxide to form aluminum oxide and iron. The heat generated by this "thermal fuse" initiates the exothermic reaction in the infiltrated preform between the nickel and the liquid infiltrant, whereby nickel aluminide, $Ni_3Al$, doped with boron is formed. As the front propagates, shrinkage induced by the reaction and by solidification of the aluminide is fed by the liquid infiltrant, driven by the pressure applied to the melt at the entrance of the preform.

EXAMPLE 7

Example 7 is provided to show how a silicon carbide article can be prepared according to the method of the invention.

A graphite foam containing 60 percent by volume open porosity, with an overall density of 600 kg/m³, below which a layer of molybdenum powder 1 μm in size is located, is infiltrated with molten silicon at a temperature of 1450° C. and pressure of 3.45 MPa (500 psi) in an argon atmosphere. The preform containing carbon and molybdenum is preheated to about 1000° C.

During infiltration, little reaction takes place between graphite and the molten silicon as a result of the low temperature of the preform and the appropriately large microstructural scale of the carbon foam. When the melt reaches the molybdenum, molybdenum silicides are formed. The heat generated by this "thermal fuse" initiates the exothermic reaction whereby silicon carbide, SiC, is formed in the infiltrated preform. As the front propagates through the infiltrated preform, the shrinkage induced by the formation reaction and solidification of SiC is continuously fed by the pressure applied to the melt at the entrance of the preform.

EXAMPLE 8

Example 8 is provided to show how a composite article having a spatially graded composition can be prepared according to the method of the invention.

A preform is fabricated by packing niobium wires of 250 μm diameter parallel to each other. The wires are of different length. All wires start at the bottom of the preform but end at different heights within the preform, resulting in a volume fraction which varies from 17 percent by volume at the top to 20 percent by volume at the bottom. This preform is seated on a layer of cobalt powder 0.5 μm in size, is preheated to a temperature of 750° C. and is infiltrated with molten aluminum at a temperature of 700° C. and pressure of 3.45 MPa (500 psi) in an argon atmosphere.

During infiltration, little reaction takes place between the niobium wires and the molten aluminum. When the melt reaches the cobalt powder, cobalt aluminide (CoAl) is formed. The heat generated by this "thermal fuse" initiates the exothermic reaction in the infiltrated preform, whereby pure niobium aluminide $Nb_3Al$ is formed at the bottom of the preform, and a mixture of $Nb_3Al$ and niobium saturated with aluminum is formed at the top of the preform, the volume fraction of the two phases being 50%.

The resulting body exhibits a continuous gradient of composition as well of volume fraction between the two phases. The niobium-rich end is toughened by the niobium phase, while the aluminide end is most creep-resistant. As the front propagates, the shrinkage induced by the reaction is continuously fed by the pressure applied to the melt at the entrance of the preform.

EXAMPLE 9

Example 9 is provided to show how a fully dense, fully reacted coating can be produced according to the method of the invention.

A dense titanium piece is placed in a slightly oversized crucible, the space between the piece and the crucible being filled with coarse titanium powder, leaving 30 percent by volume pores. The bottom of the crucible contains titanium powder 5 $\mu m$ in diameter with a porosity of 48 percent by volume. The crucible is heated to a temperature of 600° C. and infiltrated with a melt of aluminum at a temperature of 700° C. and pressure of 6.9 MPa (1000 psi) in an argon atmosphere.

During infiltration, the aluminum fills the space in the porous layer without reacting substantially with the titanium. As soon as the melt reaches the fine titanium powder at the bottom of the crucible, it reacts to form titanium aluminides. The heat generated by this "thermal fuse" initiates the exothermic reaction in the infiltrated preform, whereby the intermetallic $Ti_3Al$ is formed. As the front propagates, shrinkage induced by the reaction and solidification of $Ti_3Al$ is continuously fed by the pressure applied to the melt at the entrance of the preform.

The resulting product has a dense and well bonded coating of oxidation-resistant $Ti_3Al$ protecting the tougher titanium piece.

EXAMPLE 10

Example 10 is provided to show how a fully dense, fully reacted $Ti_3Al$ coating can be applied to a titanium piece which is preheated only to a low temperature to avoid oxygen pick-up by the titanium powder preform.

A dense titanium piece is placed in a slightly oversized crucible, the space between the piece and the crucible being filled with coarse titanium powder, leaving 30 percent by volume pores. The bottom of the crucible contains titanium powder 5 $\mu m$ in diameter with a porosity of 48 percent by volume. The crucible is heated to a temperature below about 400° C. to prevent oxygen pickup by the titanium powder and infiltrated with a melt of aluminum at a temperature of 700° C. and pressure of 6.9 MPa (1000 psi) in an argon atmosphere.

During infiltration, the aluminum fills the space in the porous layer without reacting substantially with the titanium. As soon as the melt reaches the fine titanium powder at the bottom of the crucible, it reacts to form titanium aluminides. The heat generated by this "thermal fuse" initiates the exothermic reaction in the infiltrated preform, whereby the intermetallic $Ti_3Al$ is formed. As the front propagates, shrinkage induced by the reaction and solidification of $Ti_3Al$ is continuously fed by the pressure applied to the melt at the entrance of the preform. The resulting product has a dense and well bonded coating of oxidation-resistant $Ti_3Al$ protecting the tougher titanium piece.

Thus, the present invention is well adapted to carry out the objects and obtain the ends and advantages mentioned as well as those inherent therein. While presently prepared embodiments of the invention have been described herein, it is to be understood that many modifications and changes can be made in the method and articles produced according to the method of the invention without departing from the spirit or scope of the invention as set forth in the following claims.

What is claimed is:

1. A method for producing an article including a refractory compound comprising:
   (a) providing a preform having a first location and a second location;
   (b) infiltrating said preform with a liquid infiltrant so that said liquid infiltrant enters said preform at a first location; and
   (c) initiating a reaction between said preform and said liquid infiltrant at a second location to establish a reaction front which propagates toward said first location, and where said liquid infiltrant and said preform react to produce said article including said refractory compound.

2. The method of claim 1 wherein said liquid infiltrant is a molten metal.

3. The method of claim 2 wherein said molten metal is a molten metal selected from the group consisting of aluminum, silicon, tin, germanium, magnesium, zinc and alloys thereof.

4. The method of claim 1 wherein said liquid infiltrant further includes a first element, said preform further includes a second element and in step (c) said first element and said second element react to form said refractory compound.

5. The method of claim 1 wherein said liquid infiltrant is injected into said preform under pressure.

6. The method of claim 1 wherein step (c) of initiating said reaction between said preform and said liquid infiltrant is accomplished by providing a reactive solid phase in said preform at said second location which reacts with said liquid infiltrant.

7. The method of claim 6 wherein said preform is further characterized by a first preform temperature and said reactive solid phase reacts exothermically with said liquid infiltrant to yield an enthalpy of reaction sufficient to increase said first preform temperature to a second, higher preform temperature so that at said second, higher preform temperature said reaction between said preform and said liquid infiltrant is self-sustained.

8. The method of claim 7 wherein said first preform temperature is selected to avoid oxidation of said preform.

9. The method of claim 8 wherein said preform contains titanium and said first preform temperature is less than 400° C.

10. The method of claim 6 wherein said reactive solid phase reacts with said liquid infiltrant to produce a minimal amount of a gaseous reaction product to avoid gas entrapment and pore formation within said article.

11. The method of claim 6 wherein said reactive solid phase is present in said preform in an amount in the range of from about 10 percent by volume to about 90 percent by volume.

12. The method of claim 6 wherein said preform further includes a preform outer surface and said reactive solid phase is incorporated in said preform outer surface.

13. The method of claim 12 further including a step of exposing said preform outer surface to said liquid infiltrant to produce a coating of said refractory compound on said preform outer surface.

14. The method of claim 6 wherein said reactive solid phase does not react with said preform.

15. The method of claim 6 wherein said preform includes at least two constituents so that a spatial composition gradient with respect to said constituents exists in said reactive solid phase and a refractory compound having a graded composition is produced.

16. The method of claim 6 wherein said reactive solid phase is an element which makes up said refractory compound.

17. The method of claim 6 wherein said reactive solid phase is a powder, further characterized by a particle size and said particle size is in the range of from about 0.1 $\mu m$ to about 5 mm.

18. The method of claim 17 wherein said powder is a powder of an element selected from the group consisting of nickel, iron and titanium and mixtures thereof.

19. The method of claim 6 wherein said reaction front is established at said second location in said preform where said liquid infiltrant initially reacts with said reactive solid phase.

20. The method of claim 1 wherein step (c) of initiating a reaction between said preform and said liquid infiltrant is accomplished by applying an energy source selected from the group consisting of a torch flame, a laser pulse, resistance heating and an electrical discharge and combinations thereof to said preform and said liquid infiltrant at said second location.

21. The method of claim 1 wherein said refractory compound is characterized by a high enthalpy of formation.

22. The method of claim 1 wherein said refractory compound is a refractory compound selected from the group consisting of carbide, silicide and boride compounds.

23. The method of claim 22 wherein said refractory compound is selected from the group consisting of silicon carbide, titanium carbide, silicon nitride, titanium nitride, titanium boride, molybdenum disilicide and nickel silicide.

24. The method of claim 1 wherein said refractory compound is an intermetallic compound.

25. The method of claim 24 wherein said intermetallic compound is an intermetallic compound selected from the group consisting of $Nb_3Sn$, $Fe_3Al$, $FeAl$, $Ti_3Al$, $TiAl_3$, $TiAl$, $Ni_3Al$, $NiAl$ and $CoAl$.

26. The method of claim 1 wherein said preform is a partially reacted preform prepared using a reactive infiltration process.

27. The method of claim 26 further including a step of machining said partially reacted preform into a desired shape so that a shaped refractory compound article is produced.

28. The method of claim 1 wherein said preform is further characterized by a porosity and by a shrinkage and said porosity is adequate to permit infiltrating said preform with said liquid infiltrant and said shrinkage is sufficiently low to allow fabrication of said article in near-net shape.

29. The method of claim 28 wherein said porosity is in the range of from about 10 percent by volume to about 90 percent by volume and said shrinkage is in the range of from about 1 percent by volume to about 15 percent by volume.

30. The method of claim 1 wherein said preform further includes a reinforcement phase.

31. The method of claim 30 wherein said reinforcement phase is present in said preform in the range of from about 1 percent by volume to about 90 percent by volume.

32. The method of claim 31 wherein said reinforcement phase is a refractory material selected from the group consisting of $Al_2O_3$, $TiB_2$, $B_4C$ and $SiC$ and mixtures thereof.

33. The method of claim 30 wherein said reinforcement phase is further characterized by a morphology and said morphology is selected from the group consisting of particle, whisker, plate, porous body and fiber morphology and mixtures thereof.

34. The method of claim 1 wherein said liquid infiltrant is further characterized by an infiltrant liquidus temperature and said preform is characterized by a preform temperature and said preform temperature is lower than said infiltrant liquidus temperature before step (b) of infiltrating said preform.

35. The method of claim 1 wherein said article is characterized by a selected microstructure and has low porosity wherein said low porosity is in the range of from about 5 percent by volume to about 10 percent by volume, more preferably in the range of from about 1 percent by volume to about 5 percent by volume and most preferably in the range of from about 0.1 percent by volume to about 1 percent by volume.

\* \* \* \* \*

UNITED STATES PATENT AND TRADEMARK OFFICE
CERTIFICATE OF CORRECTION

PATENT NO. : 5,366,686
DATED : Nov. 22, 1994
INVENTOR(S) : Andreas Mortensen and David C. Dunand It is certified that error appears in the above-identified patent and that said Letters Patent is hereby corrected as shown below:

Column 8, line 41: after "5," (first occurrence) insert -- 6,--.
Column 11, line 37: change "reactions", to -- reaction --.

Signed and Sealed this

Twenty-second Day of August, 1995

Attest:

BRUCE LEHMAN

*Attesting Officer*     *Commissioner of Patents and Trademarks*